May 28, 1940.    W. L. HANSEN ET AL    2,202,693
MACHINE FOR MAKING LAMINATED PINIONS
Filed Feb. 17, 1938    4 Sheets-Sheet 1

INVENTORS
WILLIAM L. HANSEN
IRA N. HURST
BY Toulmin & Toulmin
ATTORNEYS

May 28, 1940.     W. L. HANSEN ET AL     2,202,693
MACHINE FOR MAKING LAMINATED PINIONS
Filed Feb. 17, 1938     4 Sheets-Sheet 2
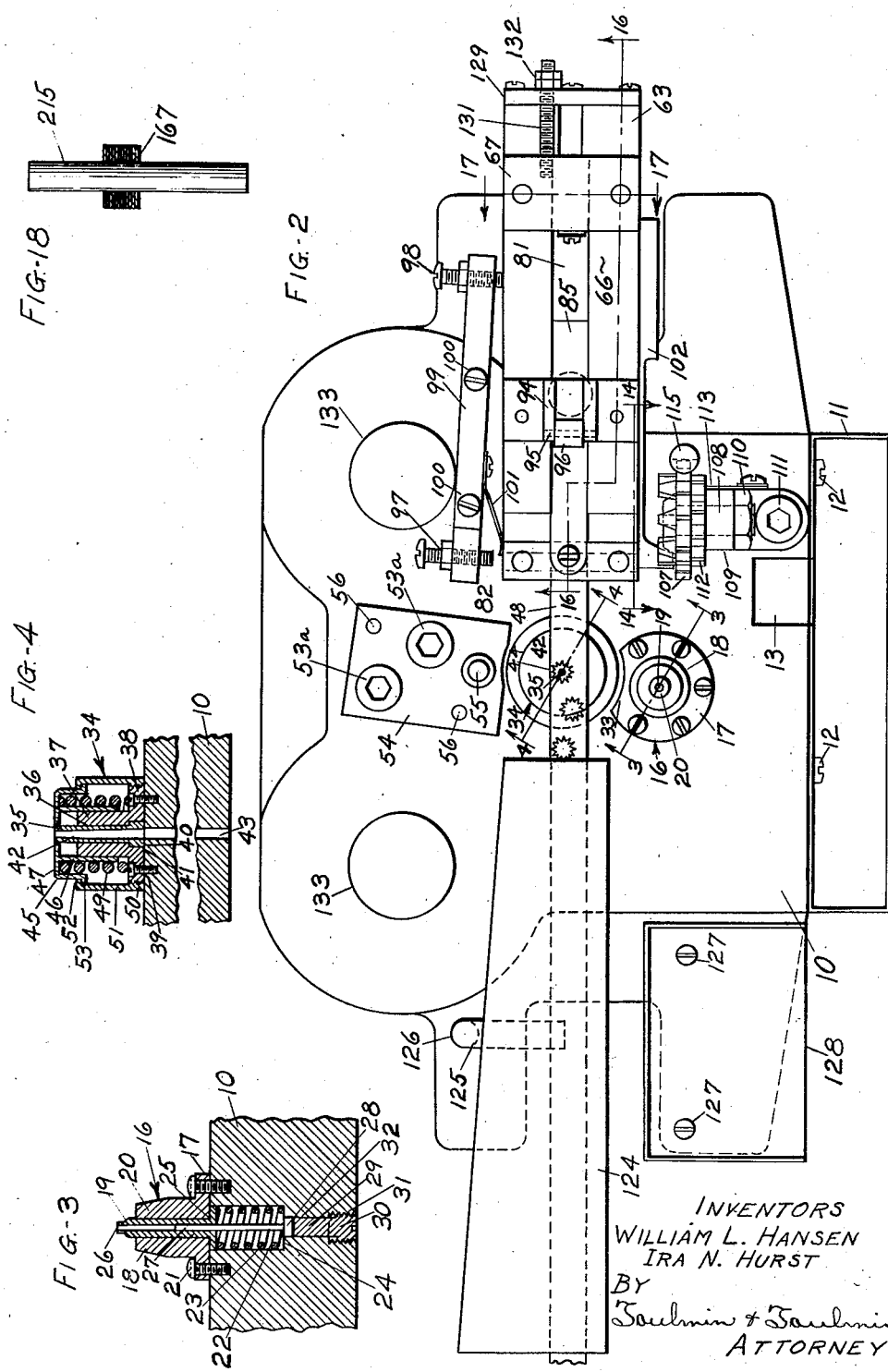
INVENTORS
WILLIAM L. HANSEN
IRA N. HURST
BY
Toulmin & Toulmin
ATTORNEYS

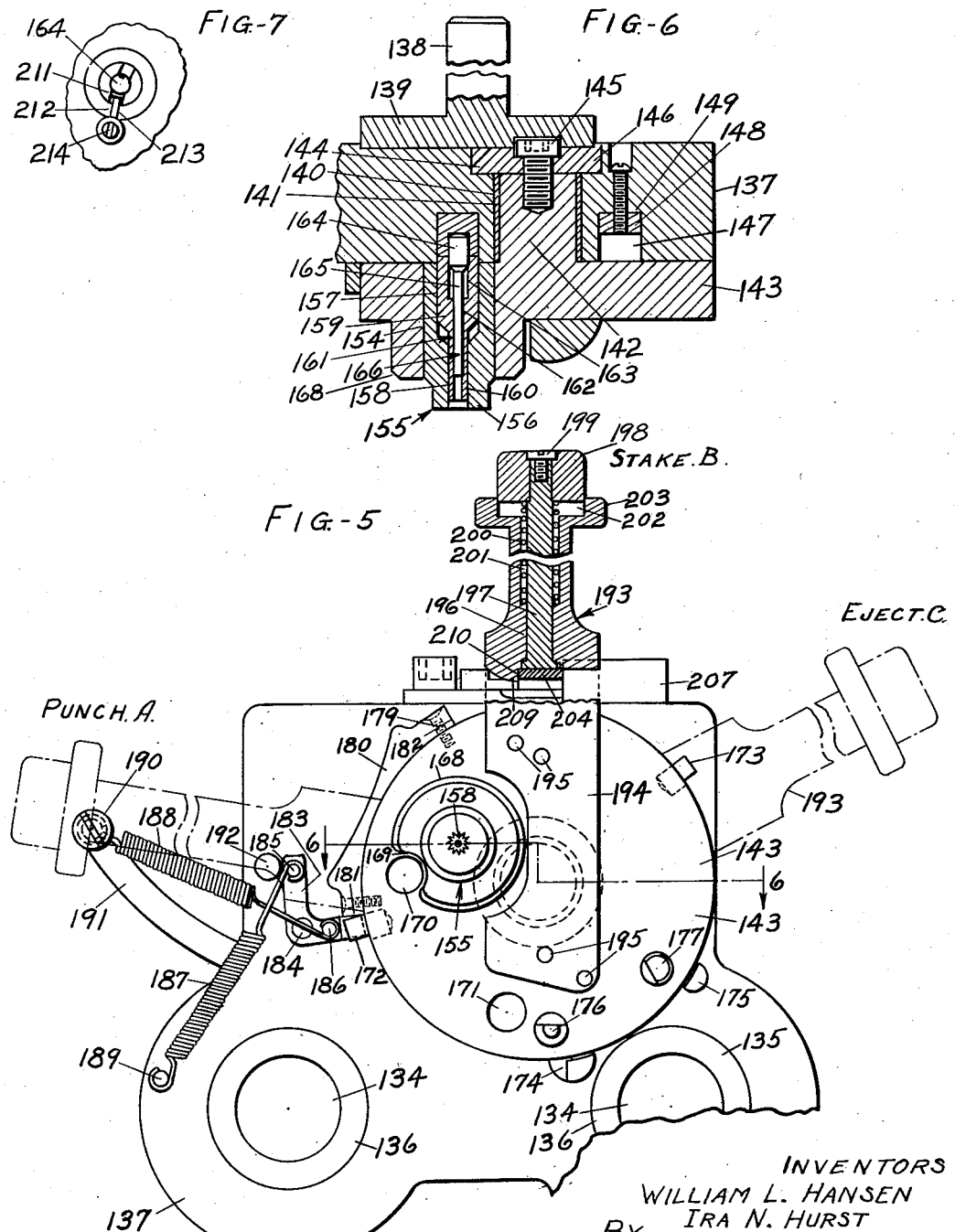

May 28, 1940. W. L. HANSEN ET AL 2,202,693
MACHINE FOR MAKING LAMINATED PINIONS
Filed Feb. 17, 1938 4 Sheets-Sheet 4
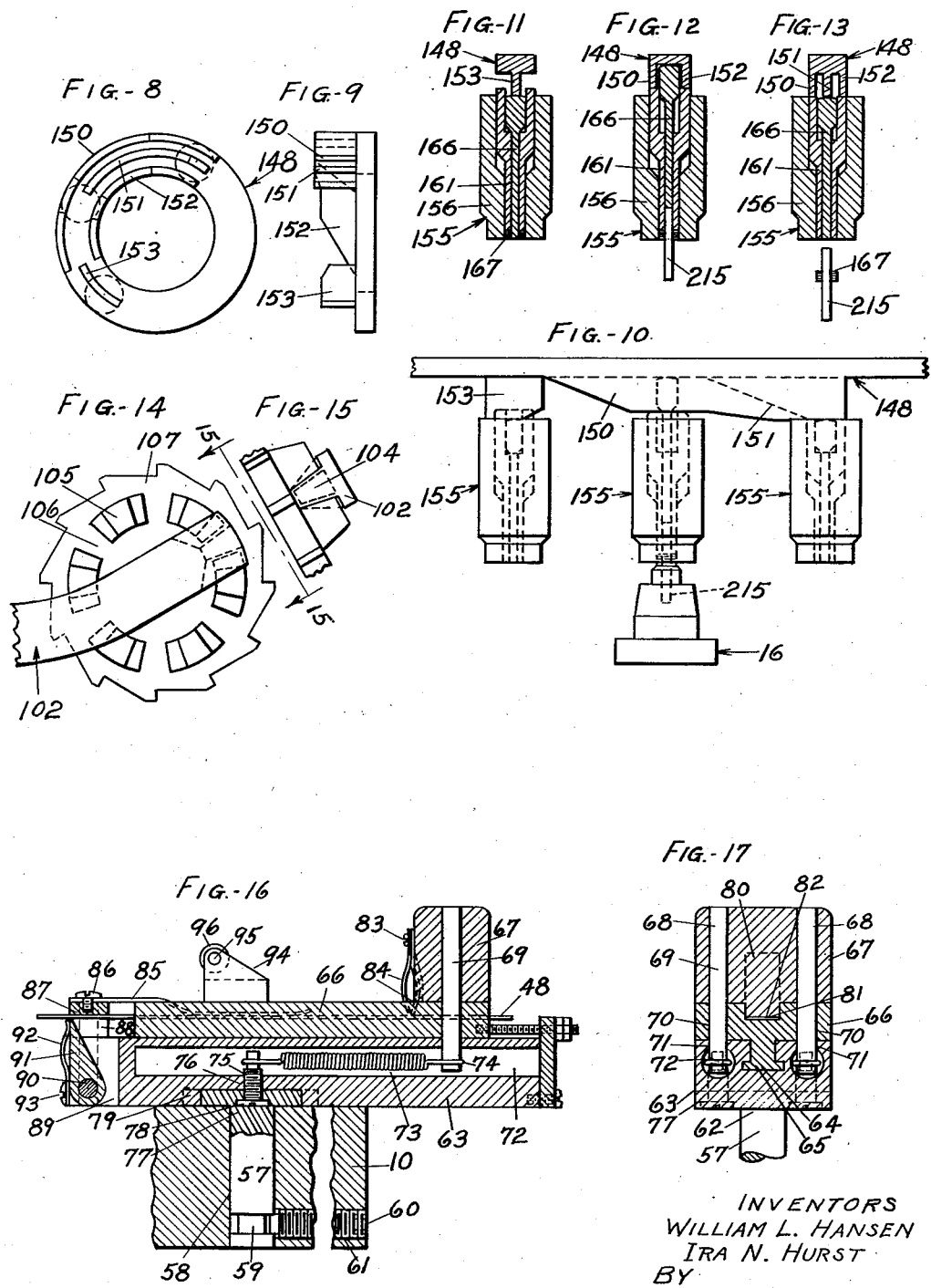
INVENTORS
WILLIAM L. HANSEN
IRA N. HURST
BY
Toulmin & Toulmin
ATTORNEYS Patented May 28, 1940

2,202,693

UNITED STATES PATENT OFFICE 2,202,693

MACHINE FOR MAKING LAMINATED PINIONS

William L. Hansen and Ira N. Hurst, Princeton, Ind., assignors to Hansen Mfg. Company, Inc., Princeton, Ind., a corporation of Indiana Application February 17, 1938, Serial No. 191,016

18 Claims. (Cl. 29—34)

This invention relates to gear-making machinery, and in particular, to machines for manufacturing laminated gears and pinions.

One object of this invention is to provide a laminated pinion-making machine, wherein a compound die is provided for punching both the hole and the teeth at a single stroke, multiple punchings being received within the die, wherein these multiple punchings are placed upon the pinion shaft while they are still in the die.

Another object is to provide such a machine, wherein a strip of material is automatically fed through the machine, the die and strip of material being staggered relatively to each other during the feeding operation so as to enable the use of a broad strip of material from which a double row of pinion punchings is obtained, without the necessity of running the strip through the machine more than once.

Another object is to provide a compound die machine for making laminated pinions, wherein a strip of pinion-making-material is fed through the machine step-by-step in response to the action of the die in punching out the laminated pinion portions.

Another object is to provide such a machine, wherein a multiplicity of laminated pinion portions is punched into the die at one station, whereupon the die is shifted to another station, where the pinion shaft is inserted in the pinion portions.

Another object is to provide a machine as set forth immediately above, wherein the die is moved to a third station, where the laminated pinion now mounted on its shaft is ejected from the die.

Another object is to provide a method of making laminated pinions comprising punching the laminations from a moving strip of material so as to simultaneously form the pinion teeth and shaft, stacking these laminations within the die and then simultaneously uniting all of the laminations while they are still within the die by pressing a pinion shaft through the aligned holes of the laminations as held in position by the die.

Another object is to provide a compound die machine for making laminated pinions, wherein the die is moved successively into a plurality of stations, a cam being provided to actuate the parts of the die differently at each station so that at the first station the die punches out a pinion lamination; at the second station it mounts the stack of assembled laminations upon a pinion shaft; and at the third station ejects this assembly, consisting of the laminated pinion portions mounted upon a pinion shaft.

In the drawings:

Figure 2 is a top plan view of the bottom portion of the machine with the upper portion of Figure 1 removed.

Figure 3 is a vertical section along the line 3—3 of Figure 2, showing the holder for the pinion shafts.

Figure 4 is a vertical section along the line 4—4 in Figure 2, showing the punch and stripper construction of the machine.

Figure 5 is a bottom plan view of the upper portion of the laminated pinion-making machine shown in Figure 1.

Figure 6 is a vertical section along the irregular line 6—6 in Figure 5.

Figure 7 is an enlarged detail view of the compound upper die of Figures 10 to 13, inclusive, showing the means for preventing rotation of the die sleeve surrounding the punch for punching the shaft holes in the pinion laminations.

Figure 8 is a bottom plan view of the cam for selectively controlling the different actions of the upper compound die shown in Figures 10 to 13.

Figure 9 is a side elevation of the cam shown in Figure 8.

Figure 10 is a lay-out development of the cam shown in Figures 8 and 9, with the upper compound die shown in its three successive positions of punching, staking and ejecting the pinions.

Figure 11 is a central vertical section through the upper compound die and cam portion, showing these parts in position for the punching operation.

Figure 12 is a view similar to Figure 11, but showing the parts in position for a staking operation, wherein the pinion shaft is pressed through the pinion laminations.

Figure 13 is a view similar to Figures 11 and 12, but showing the parts in position for an ejecting operation.

Figure 14 is an enlarged detail elevation of the ratchet stop device for the feeding mechanism, taken along the line 14—14 in Figure 2.

Figure 15 is a view taken along the line 15—15 in Figure 14.

Figure 16 is a vertical section taken along the irregular line 16—16 in Figure 2, showing details of the strip-feeding mechanism.

Figure 17 is a vertical cross section, through the feeding mechanism, taken along the line 17—17 in Figure 2.

Figure 18 is an enlarged cross sectional view of a completed laminated pinion, with the laminations in position upon the pinion shaft.

*General construction*

Figure 1:
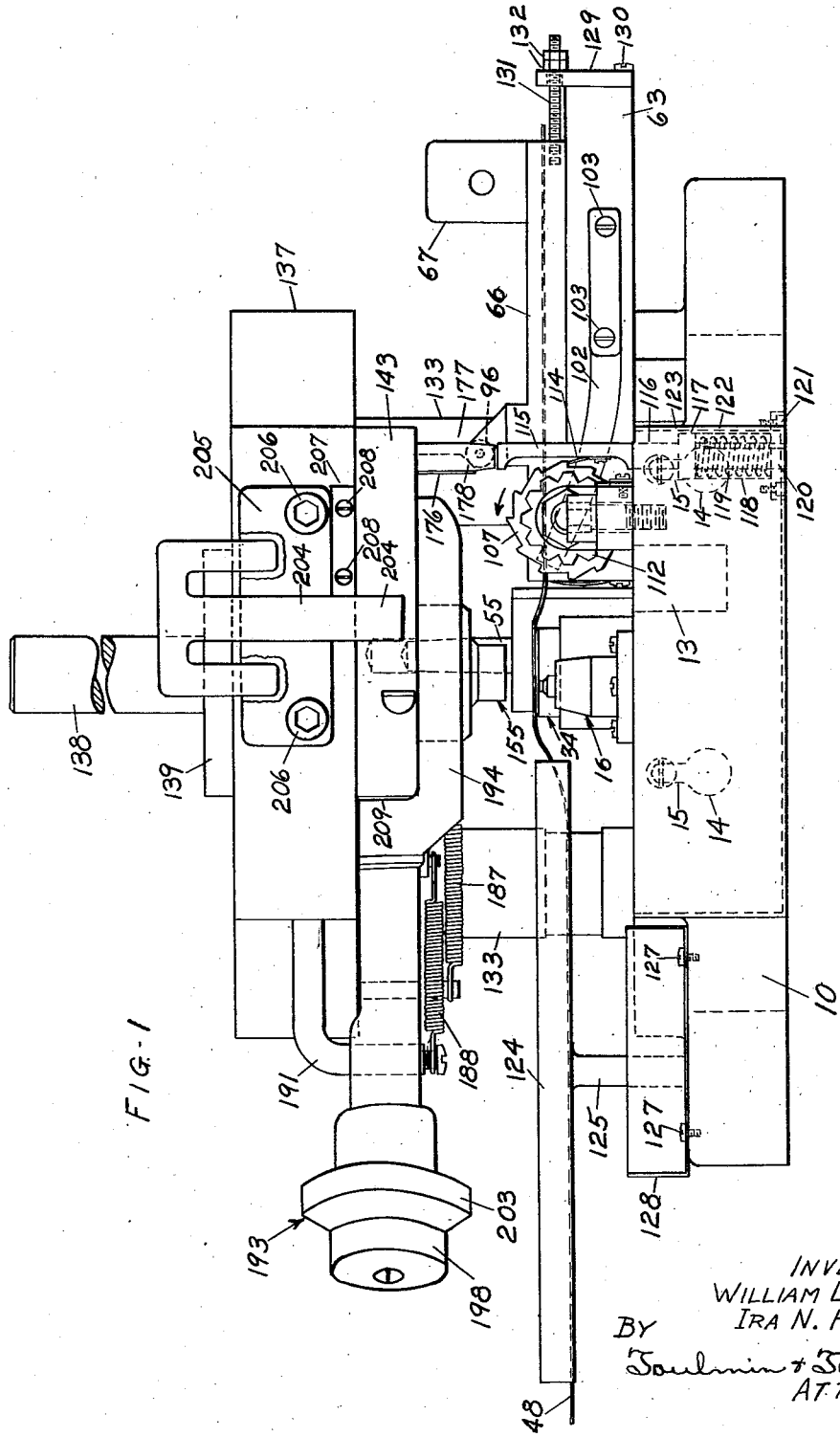
Figure 1 is a front elevation of the laminated pinion-making machine of this invention.

In general, the laminated pinion-making machine of this invention consists of a base which carries the punch for punching out the pinion laminations. This base also carries feeding mechanism for automatically feeding a strip of pinion material past the punch, and at the same time staggering the material relatively to the punch so that the punchings are made in two rows within the material. This feature enables the use of a broad strip of pinion material, the handling of a board strip being considerably simpler than that of a narrow strip. At the same time, it eliminates the necessity of running the broad strip twice through the machine. The upper portion of the machine is attached to the platen of a press, and moves up and down, carrying with it the compound die which cooperates with the punch to produce the pinion laminations.

This compound die consists of a sleeve movable relatively to the die casing and containing a punch for punching out the shaft hole in the pinion laminations. The sleeve is movable upwardly within the die casing as additional pinion laminations are punched and received within the die casing. The die casing and die are mounted within a head which may be swung into three successive stations, namely, the punching station where a stack of laminations is punched into the die casing, thence to the staking station, where a pinion shaft is pressed into the stacked pinion laminations, and finally into an ejecting station, where the assembled pinion and its shaft are ejected from the machine.

*Base and punch construction*

The machine consists broadly of two portions, as shown in Figure 1. The lower half of the machine consists of a base portion having a pair of uprights, upon which the upper half of the machine moves up and down. The base portion 10 (Figures 1 and 2) is provided with a pinion holder 11 secured to the front thereof, as by the set screws 12, and having a chute 13 for directing the finished pinions into the holder 11 as they fall from the die in the ejecting position. The holder 11 is removably mounted upon the set screws 12 by means of the enlarged hole and slot construction shown at 14 and 15, respectively, in Figure 1. Thus by lifting the holder 11 the enlarged holes 14 may be raised to the level of the set screws 12, whereupon the holder 11 can be withdrawn from the machine.

Likewise mounted upon the base 10 is a shaft holder, generally designated 16, and consisting of a flange 17 and an upright portion 18, having a movable tubular member 19 reciprocable within a bore 20 therein (Figure 3). The shaft holder 16 is secured to the base 10 by means of set screws 21, in position directly over a recess 22 within which is mounted a coil spring 23, one end of which engages the bottom 24 of the recess 22 while the other end engages and urges upwardly the flanged portion 25 on the lower end of the tubular member 19. In this manner the tubular member 19 is yieldingly urged in an upward direction within the upper portion 18 of the shaft holder 16. The tubular member 19 is provided with a central bore 26 for receiving the pinion shaft so as to hold it in position until the staking or shaft-inserting operation is completed. For supporting the lower end of the pinion shaft there is provided a pin 27, the lower end of which is enlarged, as at 28 (Figure 3), and rests upon the reduced portion 29 of a plug 30, threaded into a threaded hole 31 in the bottom of the base 10 so that the reduced portion 29 extends upwardly through a hole 32 coaxial with the bore 26 and pin 27.

The flange 17 is cut away, as at 33 (Figure 2), to provide space for the punch unit, generally designated 34 (Figure 4). The punch unit 34 consists of a punch 35 mounted within a bore 36 within an upstanding member 37, the lower portion of which is flanged, as at 38, and secured to the base 10 by the set screws 39. The lower end of the punch 35 is enlarged, as at 40, and fits within a corresponding enlargement 41 of the bore 36. The punch 35 is provided with a tapered bore 42, the lower end of which communicates with a bore 43 passing through the base 10, and providing for the escape of the punchings produced in making the holes in the pinion laminations. The periphery of the punch 35 is provided with multiple teeth 44 (Figure 2) for producing the corresponding teeth upon the pinion laminations.

In order to expel the pinion laminations from the punch 35, a stripping device 45 is provided consisting of a sleeve 46 encircling the upstanding portion of the member 37, and having a top flanged portion 47 for engaging the strip of material 48. The stripping device 45 is urged upwardly into yielding engagement with the strip of material 48 by a coil spring 49, the upper end of which engages the flanged portion 47, and the lower end the flanged portion 38 of the upstanding member 37. The latter is threaded, as at 50, to receive a collar 51 having a flange 52 for limiting the vertical movement of the stripping device 45, the latter having a cooperating flange 53 for engagement with the flange 52 (Figure 4). Likewise secured to the base 10, as by the countersunk screws 53ª, is a plate 54 carrying a tapered safety locking pin 55 (Figures 1 and 2). As will be hereinafter seen, the locking pin 55 enters a corresponding bore in the upper portion of the machine, thereby preventing the die from being closed upon the punch until the parts are in proper alignment. The plate 54 is properly located with respect to the base 10 by the dowel pins 56.

*Feeding mechanism*

The feeding mechanism for feeding the strip of material 48 to the machine is mounted upon a shaft 57 (Figure 16) rotatable within a vertical bore 58 and having an annular recess 59 for receiving the end of a countersunk set screw 60. The set screw 60 is threaded through a threaded bore 61 in the base 10, and limits the up and down motion of the shaft 57. Mounted, as at 62, upon the shaft 57 is a swingable carriage 63 (Figure 16), having a dovetailed longitudinal grooveway 64 arranged centrally therein (Figure 17) to receive the longitudinal dovetailed rib 65 of the feeding slide 66. Mounted upon the feeding slide 66 is a feeding head 67 having twin bores 68 for receiving pins 69, which pass downwardly through the bores 70 in the slide 66 and through longitudinal slots 71 in the carriage 63, the ends emerging within horizontal bores 72 within the carriage 63.

The bores 72 contain spiral springs 73, one end of each of which is attached, as at 74, to a pin 69. The opposite end of each spring 73 is connected to the upper end of a set screw 75, threaded through the aperture 76 in the carriage 63, and likewise through the aperture 77 in the flanged head 78 of the shaft 57. The head 78 is received within a recess 79 beneath the carriage 63. In this manner the set screws 75 simultaneously secure the flanged head 78 of the shaft 57 to the carriage 63, and serve as anchorages for the coil springs 73.

The feeding head 67 is provided with a downwardly projecting ridge 80 within a groove 81 in the feeding slide 66, but spaced apart therefrom slightly so as to form an aperture 82 of rectangular cross section for the passage of the material strip 48. Secured by the set screw 83 to the feeding head 67 are two feeding springs 84, bowed in opposite directions, with their lower ends arranged to engage the upper surface of the material strip 48, as it lies in the bottom of the groove 81. The material strip 48 is pressed downwardly against the bottom of the groove 81 by a flat spring 85 (Figure 16), secured by the set screw 86 to the bridge 87, the latter being mounted on the uprights 88 of the carriage 63.

Immediately beneath the bridge 87 in the carriage 63 is a chamber 89 containing a transverse shaft 90, upon which is mounted a pawl 91. The later is pressed by the flat spring 92 into engagement with the lower surface of the material strip 48, thereby urging the latter into engagement with the bridge 87. In this manner the material strip 48 is permitted to move to the left (Figure 16), but prevented from moving rearwardly to the right. The flat spring 92 is secured by the set screw 93 to the carriage 63. Mounted upon the upper side of the slide 66 (Figure 16) is a bracket 94 carrying an axle 95, upon which is mounted a roller 96. This roller 96 is engaged by a member mounted upon the upper part of the machine, as hereinafter described, for moving the slide 66 to the right against the tension of the coil springs 73 during the descent of the upper portion of the machine.

The swinging of the carriage 63 about its pivot shaft 57 is limited by stop screws 97 and 98, threaded into the opposite ends of a bar 99, secured by the set screws 100 to the base 10 (Figure 2). A flat spring 101 urges the left-hand end of the carriage 63 toward the front of the machine. For accurately controlling the positions at which the carriage 63 halts, a rotary stop mechanism is provided. This consists of an arm 102, secured by the set screws 103 to the side of the carriage 63 (Figures 1 and 2), and having its forward end 104 wedge-shaped (Figure 15) and adapted to engage either wedge-shaped stops 105 or the spaces or intervals 106 between them (Figure 14). The stops 105 are secured to the rearward face of a ratchet wheel 107, mounted upon a stud 108, threaded within a bracket 109 and anchored in position by the locknut 110 (Figure 2). The bracket 109 is secured, as at 111, to the base 10 (Figure 2). A second ratchet wheel 112 (Figures 1 and 2) is mounted adjacent the first ratchet wheel 107 and may be integral therewith. A spring pawl 113 engages the second ratchet wheel 112 and prevents reverse rotation of the first ratchet wheel 107.

To actuate the ratchet wheel 107 there is provided a spring pawl 114 (Figure 1), mounted upon a vertical reciprocating rod 115, the lower end of which passes through a bore 116 in the base 10 and terminates in an enlarged head 117 within an enlarged bore 118. A coil spring 119 urges the head 117 and rod 115 upwardly, and its lower end abuts against a plate 120, secured by the set screws 121 to the bottom of the base 10, thereby closing the bore enlargement 118. A key 122 projects upwardly from the plate 120 and engages a keyway 123 in the head 117 to prevent the turning of the rod 115 as it reciprocates. The rod 115 is reciprocated by the up and down motion of the upper portion of the machine, as described hereinafter.

The material strip 48, on the opposite side of the punch 35 from the carriage 63, passes through a hollow guide 124 mounted upon an arm 125 secured, as at 126 (Figure 2), to the base 10. Also secured to the latter, as by the set screws 127, is a holding box 128, which may contain the shafts upon which the pinion laminations are later mounted. For limiting the reciprocation of the slide 66 relatively to the carriage 63 there is provided an end bracket 129, secured as at 130 to the end of the carriage 63, and having a stop screw 131 threaded through the upper end thereof, and held in place by locknuts 132 (Figures 1 and 2).

*Upper die construction*

Mounted in the base 10 of the machine and rising therefrom are two posts 133, which pass through apertures 134 in bushings 135 (Figure 5), mounted in bores 136 passing through the movable support 137. The movable support 137 is in the form of a thick plate upon which is mounted an upwardly extending shaft 138, secured by its enlarged head 139 to the upper side of the movable support 137 (Figures 1 and 6). Connection is made between the movable support 137 and the platen of any suitable press by means of the shaft 138, which enters a corresponding aperture in the platen and is clamped therein. In this manner the movable support 137 is moved up and down with the platen of the press and slides relatively to the vertical posts 133 and is guided thereby.

The movable support 137 is provided with a vertical bore 140 having a bushing 141 therein for receiving the pivot shaft 142, extending upwardly from the rotatable head 143. A retaining plate 144 is secured by the set screw 145 to the upper end of the pivot shaft 142, and rests within a countersink 146 in the upper surface of the movable support 137, beneath the enlarged head 139 of the shaft 138 (Figure 6). An annular groove 147 is provided in the lower surface of the movable support 137, and receives a fixed annular cam 148 secured thereto, as at 149. The cam 148 is provided with arcuate ridges 150, 151, 152 and 153, which determine the selective action of the cam upon the die mechanism carried by the head 143, and moved relatively to the cam 148.

Mounted in the bore 154 in the lower side of the head 143 is an upper die, generally designated 155, and consisting of an outer sleeve 156 having bores 157 and 158 of different diameters for receiving the upper and lower portions 159 and 160 of an inner sleeve, generally designated 161. The latter is provided with upper and lower inner bores 162 and 163 of different diameters for supporting the head 164 and shank 165 of a punch, generally designated 166. The inner sleeve 161 is adapted to slide freely within the outer sleeve 156, and the punch 166 is likewise adapted to slide freely within the inner sleeve 161. The heights to which these members can rise during the operation of the machine are regulated by the ridges 150 to 153 upon the fixed annular cam 148. The bore 158 within the outer sleeve 156 of the die 155 is formed with the cross section of a pinion (Figure 5) so that it receives the pinion laminations 167 as they are punched from the material strip 48, and holds them by their frictional engagement with its walls. As the pile of pinion laminations accumulates the inner sleeve 161 rises (Figure 11), but the punch 166 remains in the position of Figure 11 for punching out the shaft holes in each lamination 167.

The upper die 155 is surrounded by an annular member 168 having a notch 169 arranged to make way for a socket 170. A second socket 171 is likewise provided, spaced apart from the first socket 170 (Figure 5). The sockets 170 and 171 have tapered walls for receiving the tapered locking pin 55. The latter merely serves to prevent the parts of the upper and lower dies from being closed before they are in proper alignment, but the alignment itself is insured by an additional set of stops 172 and 173 secured to the periphery of the head 143. These stops cooperate with and respectively engage stop pins 174 and 175, mounted in the upper support 137 (Figure 5).

Likewise mounted upon the rotatable head 143 are downwardly extending push rods 176 and 177. The push rod 176 is adapted to engage the roller 96 and reciprocate the slide 66 (Figures 1 and 16) during the descent of the movable support 137, and is tapered at its lower end, as at 178, to facilitate this purpose. The push rod 177, however, engages the reciprocating rod 115, and reciprocates the latter so that its spring pawl slides over the teeth of the ratchet 107 during the descent of the movable support 137 and engages the teeth thereof to move the ratchet 107 in a counter-clockwise direction (Figure 1) as the rod 115 is urged upwardly by the coil spring 119 while the movable support 137 rises with the platen of the press.

Likewise secured to the periphery of the head 143, as by the set screws 179, is a cam 180, the opposite ends 181 and 182 of which are adapted to be engaged by one of the ends of a bellcrank 183, pivotally mounted on the stop 184 secured to the movable support 137. The opposite ends of the bellcrank 183 carry pins 185 and 186, to which are anchored the ends of the coil springs 187 and 188. The outer end of the coil spring 187 is anchored to the pin 189, mounted on the movable support 137, whereas the outer end of the spring 188 is secured to the set screw 190, threaded into the outer end of the downwardly extending bracket 191, the upper end of which is mounted upon the movable support 137 (Figures 1 and 5). The motion of the bellcrank 183 is limited by the stop pin 192, likewise mounted in the movable support 137.

The head 143 is moved to and fro by a handle 193 into any one of three positions, respectively designated A, B and C (Figure 5). The handle 193 is provided with an extension 194, secured as at 195, to the lower side of the head 143. Arranged within the bore 196 of the handle 193 is a reciprocable pin 197, the outer end of which terminates in a button 198, secured thereto by the set screw 199 (Figure 5). A coil spring 200 within an enlarged bore 201 urges the push button 198 and pin 197 outwardly. The inner end of the push button 198 is received within a recess 202, formed in the annular head 203 of the handle 193. The inner end of the pin 197 engages the end of a T-shaped flat spring 204, the outer arms of which are secured by the plate 205 to the movable support 137, the plate 205 itself being held in position by the screws 206 (Figure 1). An abutment strip 207 engages the right-hand side of the spring 204 and is secured to the movable support 137 by the set screws 208.

The handle 193 is formed so that its intermediate portion is provided with a shouldered end 209 adjacent the periphery of the head 143, but spaced apart therefrom. Figure 5 is broken away in its upper portion to disclose the construction of this shouldered end 209. The latter is provided with a slot in the form of a shoulder 210, into which the lower end of the flat spring 204 snaps after it passes the curved sides of the shouldered end 209 (Figure 5). This structure serves as a detent or latch which is released when the operator presses the push button 198 and pin 197 inwardly to push the spring 204 out past the shoulder 210. In order to prevent rotation of the inner sleeve 161 of the die 155 within the outer sleeve 156 thereof, these two sleeves are slotted as at 211 and 212, respectively (Figure 7), to receive a key-like finger 213 mounted by the set screw 214 upon the lower side of the head 143.

Operation

The pinion-making machine of this invention is mounted with its base 10 upon the bed of a punch press, and with the shaft 138 secured to the platen thereof in the manner previously described. In setting up the machine the press platen is arranged to move a sufficient distance such that the punch 35 will enter the die 155, just far enough to punch the pinion lamination 167 completely out of the material strip 48. The latter is preferably in the form of a roll, and is wide enough to permit two rows of pinion laminations 167 to be punched therefrom as the strip 48 moves under the die 156 and over the punch 35.

The feeding mechanism, operated in connection with the slide 66 upon the carriage 63, is arranged so as to feed the material strip 48 forwardly and stagger each punching on the strip as it moves under the die 156. By this arrangement the use of a wider strip is facilitated, this wide strip being more easily handled and fed into the die than a narrow strip. At the same time the staggering of the punchings permits the maximum number of pinion laminations 167 to be secured from the strip without waste of material and without the necessity of running the strip 48 twice through the machine.

In operating the machine the operator first places a pinion shaft 215 in the bore 26 within the shaft holder 16 (Figures 2 and 3). The handle 193 is then moved to position A (Figure 5), which is the punching position of the machine. When this occurs the head 143 rotates so as to bring the stop 172 into engagement with the stop pin 174. The same action causes the end 181 of the cam 180 to move the bell-crank 183 in a clockwise direction so that its upper end slides along the top of the cam 180, and comes to rest against the cam end 182. The bellcrank 183, by reason of the placing of the springs 187 and 188, has a toggle action so that both springs urge the end of the bellcrank against the particular end 181 or 182 of the cam 180, with which the bellcrank 183 is then in engagement.

It will be observed from Figure 5 that in position B, for example, the end of the spring 188, which is connected to the pin 186, is slightly to one side of the center of the pivot pin 184, thereby causing the pull of the spring 188 to be exerted with a leverage effect. The spring 187 at the same time, by engaging the pin 185, exerts a considerable leverage upon the bellcrank 183 relatively to its pivot stop 184. Thus, when the handle 193 has been shifted into its punching position A, the bellcrank 183 is urged against the end 182 of the cam 180, and the stop 172 against the stop pin 174.

The material strip 48 is then threaded through the automatic feeding mechanism on the slide 66 of the carriage 63 and under the die 155, which is then in coincidence with the punch 35. The operator then operates the press so that its platen and the movable support 137 descend a sufficient number of strokes, punching out a pinion lamination 167 at each stroke. At this time the cam 148 and the die 155 are in the positions shown in Figure 11, so that the arcuate ridge 153 engages the punch 165 and forces it downwardly until its end is substantially flush with the end of the outer sleeve 156. The inner sleeve 161 is suitably slotted to permit the passage of the ridge 153 as the head is rotated. Thus the upper end 159 of the inner sleeve 161 is forked.

As each lamination 167 is punched it is forced upwardly into the outer sleeve 156, the punch 35 producing the teeth on the pinion lamination and the punch 165 producing the shaft hole. The operator operates the press until a sufficient number of laminations 167 has been accumulated within the die 155 (Figure 11), the inner sleeve 161 rising to permit the accommodation of these laminations 167. Meanwhile, each descent of the movable support 137 has caused the push rod 176 to move the roller 96 and slide 66 to the right against the tension of the coil spring 73 (Figure 16), causing the feeding springs 84 to slide loosely over the material strip 48, which is then locked against movement to the right by the action of the pawl 91 as urged thereagainst by the flat spring 92. When the movable support 137 rises after completing a punching stroke, however, the coil spring 73 moves the slide 66 to the left, and the feeding springs 84 engage and shift the material strip 48 one stroke to the left as the spring-urged pawl 91 yields to release the material strip 48 (Figure 16). Meanwhile, the staggering action has likewise been brought about in response to the descent of the movable support 137 and push rod 177. At each stroke thereof the reciprocating rod 115 is pushed downwardly, in the manner previously described, and on its return stroke moves the ratchet 107 in a counter-clockwise direction (Figure 1). This action alternately presents either the top of a stop 105 or interval 106 (Figure 14) to the wedge-shaped end 104 of the arm 102, thereby staggering the punchings, in the manner shown in Figure 2.

When a sufficient number of pinion laminations 167 has been accumulated within the die 155 (Figure 11), the operator grasps the handle 193 and shifts it to position B, the staking position. When this occurs the flat spring 204 slips past the end 209 of the handle 193, and into the space adjacent the shoulder 210, firmly holding the handle 193 in the staking position B. At the same time the bellcrank 183 is shifted by the cam 180 into the position shown in Figure 5, and comes to rest against the end 181 thereof, so as to urge the shoulder 210 against the spring 204. While this operation is occurring, the upper and lower parts of the machine must be opened far enough for the locking pin 55 to move completely out of its socket 170. With the handle 193 in position B, the operator again operates the press one stroke and causes the movable support 137 and die 155 to descend once. In this position the outer and inner cam ridges 150 and 152 (Figure 12) are in engagement with the ends of the upper portion 159 of the inner sleeve 161, but bridging the upper end 164 of the punch 166.

The die 155 is now positioned directly over and coaxial with the shaft holder 16 (Figure 3), so that upon the descent of the die the pinion shaft 215 is forced through the holes in the pinion laminations 167, into engagement with the lower end of the punch 166, which moves upwardly to permit the entry of the shaft 215. In this manner the pinion laminations 167 are staked upon the pinion shaft 215. During the rotation of the head 143 by the handle 193, however, the push rods 176 and 177 have been moved out of the way of the roller 96 and reciprocating rod 115, respectively, so that the feeding and staggering mechanism is not operated. With the return or upward stroke of the press platen the upper and lower portions of the machine again open until the safety locking pin 55 clears its socket 171, into which it has entered as the handle 193 reaches position B.

To eject the assembled pinion from the die 155, the operator now pushes the push button 198 inwardly, thereby releasing the spring 204 from engagement with the shoulder 210, so that the handle 193 may be moved to ejecting position C. In this position the stop 173 comes into engagement with the stop pin 175. During this motion of the head 143 the cam ridges 150, 151 and 152 simultaneously come into action to move the punch 166 and the inner sleeve 161 downwardly (Figure 13), to eject the assembled pinion. The operator may now shift the handle 193 back to its position A, through position B, without operating the pushbutton 198.

The alignment of the upper die 155 with the lower punch 35 is brought about by the stops 172 and 174 of the spring 204 in engagement with the shoulder 210. The safety locking pin 55 is not relied upon for the alignment of the die and punch, but is merely intended to prevent the closing of the machine in any positions other than the punching position A and staking position B. This construction insures that the upper and lower portions of the machine are completely open before the shifting handle 193 can be moved, thereby avoiding clashing of the die members.

It will be understood that I desire to comprehend within this invention such modifications as come within the scope of the claims and the invention.

Having thus fully described the invention, what is claimed as new and desired to be secured by Letters Patent is:

1. In a pinion-making machine, a punch, a punch member and a cooperating die member having tooth-producing portions for punching out a pinion blank, a second punch member associated with one of said previously-mentioned members, and means for actuating said members simultaneously for punching out and severing from the material the teeth and shaft hole of the pinion blank at a single stroke.

2. In a pinion-making machine, a punch, a punch member and a cooperating die member having tooth-producing portions for punching out a pinion blank, a second punch member associated with one of said previously-mentioned members, means for actuating said members simultaneously for punching out and severing from the material the teeth and shaft hole of the pinion blank at a single stroke, and means for feeding a strip of material past said members.

3. In a pinion-making machine, a punch, a punch member and a cooperating die member having tooth-producing portions for punching out a pinion blank, a second punch member associated with one of said previously-mentioned members, means for actuating said members simultaneously for punching out and severing from the material the teeth and shaft hole of the pinion blank at a single stroke, means for feeding a strip of material past said members, and means for moving said strip laterally while feeding it longitudinally, whereby to stagger the punchings in said strip.

4. In a pinion-making machine, a punch, a punch member and a cooperating die member having tooth-producing portions for punching out a pinion blank, a second punch member associated with one of said previously-mentioned members, means for actuating said member simultaneously for punching out and severing from the material the teeth and shaft hole of the pinion blank at a single stroke, and step-by-step mechanism for simultaneously feeding a strip of material longitudinally past said members and laterally thereto to stagger the punchings in said strip.

5. In a pinion-making machine, a punch, a punch member and a cooperating die member having tooth-producing portions for punching out a pinion blank, means associated with said die member for collecting therein a stack of punched pinion blanks, a holder for releasably holding a pinion shaft, means for moving said die member and the opposed punch member temporarily out of alignment relatively to each other, means for moving said shaft holder into alignment with said die member, and means for bringing together said die member and said pinion shaft holder for inserting the pinion shaft in the shaft hole of the stacked pinion blanks within the die member.

6. In a pinion-making machine, a punch, a punch member and a cooperating die member having tooth-producing portions for punching out a pinion blank, means associated with said die member for collecting therein a stack of punched pinion blanks, a holder for releasably holding a pinion shaft, means for moving said die member and the opposed punch member temporarily out of alignment relatively to each other, means for moving said shaft holder into alignment with said die member, means for bringing together said die member and said pinion shaft holder for inserting the pinion shaft in the shaft hole of the stacked pinion blanks within the die member, and means for ejecting the thus assembled pinion from the die member.

7. In a pinion-making machine, a punch member and a cooperating die member having tooth-producing portions for punching out pinion blanks, a base having one of said members mounted thereon, a movable head having the other member mounted thereon, a holder for a pinion shaft, means for moving said punch member and said die member out of alignment, and means for moving said holder and said die member into alignment, whereby to punch said pinion blanks at one station and insert the pinion shaft therein at another station.

8. In a pinion-making machine, a punch member and a cooperating die member having tooth-producing portions for punching out pinion blanks, a base having one of said members mounted thereon, a movable head having the other member mounted thereon, said die member being arranged to receive a plurality of said pinion blanks in stacked arrangement, means for moving said head to move said punch member and said die member out of alignment and means for inserting a pinion shaft in said pinion blanks while so stacked in said die member.

9. In a pinion-making machine, a punch member and a cooperating die member having tooth-producing portions for punching out pinion blanks, a base, a head movable relatively to said base and having said die member mounted thereon, a holder for a pinion shaft, means for moving said head to move said punch member and said die member out of alignment and means for moving said holder and said die member toward each other to insert said pinion shaft in said pinion blank while said blank is in said die member.

10. In a pinion-making machine, a base, a pinion punch thereon, a head movable relatively to said base into a plurality of stations, a pinion die on said head adapted to receive a plurality of pinion blanks, means at one of said stations for supporting a piece of pinion material between said punch and die, means for moving said punch and die relatively to each other to punch out a pinion blank, and means at another station for inserting a pinion shaft in a plurality of blanks held within said die.

11. In a pinion-making machine, a base, a pinion punch thereon, a head movable relatively to said base into a plurality of stations, a pinion die on said head adapted to receive a plurality of pinion blanks, means at one of said stations for supporting a piece of pinion material between said punch and die, means for moving said punch and die relatively to each other to punch out a pinion blank, means at another station for inserting a pinion shaft in a plurality of blanks held within said die, and means at a third station for ejecting the assembled pinion from the die.

12. In a pinion-making machine, a base, a pinion punch thereon, a head movable relatively to said base into a plurality of stations, a pinion die on said head adapted to receive a plurality of pinion blanks, means at one of said stations for supporting a piece of pinion material between said punch and die, means for moving said punch and die relatively to each other to punch out a pinion blank, a second punch within said die for punching out the shaft hole in the pinion blank, and cam means for controlling the operability of said die relatively to said second punch.

13. In a pinion-making machine, a base, a pinion punch thereon, a head movable relatively to said base into a plurality of stations, a pinion die on said head adapted to receive a plurality of pinion blanks, means at one of said stations for supporting a piece of pinion material between said punch and die, means for moving said punch and die relatively to each other to punch out a pinion blank, a second punch within said die for punching out the shaft hole in the pinion blank, and cam means for controlling the operability of said die relatively to said second punch, said cam means being operable at one station to hold said die and said second punch in one position for punching out and receiving within said die a plurality of pinion blanks, and operable at a second station to receive a pinion shaft within the shaft hole of said pinion blanks.

14. In a pinion-making machine, a base, a pinion punch thereon, a head movable relatively to said base into a plurality of stations, a pinion die on said head adapted to receive a plurality of pinion blanks, means at one of said stations for supporting a piece of pinion material between said punch and die, means for moving said punch and die relatively to each other to punch out a pinion blank, a second punch within said die for punching out the shaft hole in the pinion blank, and cam means for controlling the operability of said die relatively to said second punch, said cam means being operable at one station to hold said die and said second punch in one position for punching out and receiving within said die a plurality of pinion blanks, operable at a second station to receive a pinion shaft within the shaft hole of said pinion blanks, and operable at a third station to eject the assembled pinion.

15. In a pinion-making machine, a fixed support, a movable support, a pinion punch on one of said supports, a compound pinion die on the other of said supports, and cam means engaging said pinion die for controlling the operability of the parts thereof, said compound pinion die having an outer die member, an inner punch member and a movable sleeve therebetween.

16. In a pinion-making machine, a fixed support, a movable support, a pinion punch on one of said supports, a compound pinion die on the other of said supports, and cam means engaging said pinion die for controlling the operability of the parts thereof, said compound pinion die having an outer die member, an inner punch member and a movable sleeve therebetween, said movable support being movable relatively to said fixed support into a plurality of stations, said cam means being operable at one station to hold said inner punch member relatively to said die member for simultaneously punching the teeth and shaft hole of a pinion blank while permitting said sleeve to move relatively to said members for receiving a plurality of pinion blanks within said die member.

17. In a pinion-making machine, a fixed support, a movable support, a pinion punch on one of said supports, a compound pinion die on the other of said supports, and cam means engaging said pinion die for controlling the operability of the parts thereof, said compound pinion die having an outer die member, an inner punch member and a movable sleeve therebetween, said movable support being movable relatively to said fixed support into a plurality of stations, said cam means being operable at one station to hold said inner punch member relatively to said die member for simultaneously punching the teeth and shaft hole of a pinion blank while permitting said sleeve to move relatively to said members for receiving a plurality of pinion blanks within said die member, said cam means being operable at a second station to hold said sleeve relatively to said die member while permitting the displacement of said inner punch member for receiving a pinion shaft within the pinion blanks in said die member.

18. In a pinion-making machine, a fixed support, a movable support, a pinion punch on one of said supports, a compound pinion die on the other of said supports, and cam means engaging said pinion die for controlling the operability of the parts thereof, said compound pinion die having an outer die member, an inner punch member and a movable sleeve therebetween, said movable support being movable relatively to said fixed support into a plurality of stations, said cam means being operable at one station to hold said inner punch member relatively to said die member for simultaneously punching the teeth and shaft hole of a pinion blank while permitting said sleeve to move relatively to said members for receiving a plurality of pinion blanks within said die member, said cam means being operable at a second station to hold said sleeve relatively to said die member while permitting the displacement of said inner punch member for receiving a pinion shaft within the pinion blanks in said die member, said cam means being operable at a third station to move both said sleeve and said inner punch member relatively to said die member to eject the assembled pinion from said die member.

WILLIAM L. HANSEN.
IRA N. HURST.